(12) United States Patent
Hamauzu et al.

(10) Patent No.: US 8,845,154 B2
(45) Date of Patent: Sep. 30, 2014

(54) MOTORCYCLE

(75) Inventors: Akira Hamauzu, Saitama (JP); Kotaro Fujiyama, Saitama (JP); Jun Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 13/393,065

(22) PCT Filed: Aug. 31, 2010

(86) PCT No.: PCT/JP2010/064842
§ 371 (c)(1),
(2), (4) Date: Apr. 16, 2012

(87) PCT Pub. No.: WO2011/025044
PCT Pub. Date: Mar. 3, 2011

(65) Prior Publication Data
US 2012/0188777 A1 Jul. 26, 2012

(30) Foreign Application Priority Data
Aug. 31, 2009 (JP) .................................. 2009-200503

(51) Int. Cl.
*B62J 6/00* (2006.01)
*B62J 6/04* (2006.01)
*B62J 15/00* (2006.01)

(52) U.S. Cl.
CPC ... *B62J 6/04* (2013.01); *B62J 15/00* (2013.01)
USPC .......................... 362/475; 362/473; 362/476

(58) Field of Classification Search
USPC .......................................... 362/473, 475, 476
See application file for complete search history.

(56) References Cited

U.S. PATENT DOCUMENTS

| 2005/0082100 A1* | 4/2005 | Sakaki et al. ................. 180/219 |
| 2007/0025113 A1 | 2/2007 | Isayama et al. |
| 2008/0205073 A1* | 8/2008 | Suita ............................ 362/473 |

FOREIGN PATENT DOCUMENTS

| EP | 1 785 341 A1 | 5/2007 |
| JP | 52-99787 A | 7/1977 |
| JP | 61-109885 U | 7/1986 |
| JP | 62-146690 U | 9/1987 |
| JP | 3-41363 Y2 | 8/1991 |
| JP | 6-156341 A | 6/1994 |

\* cited by examiner

*Primary Examiner* — Meghan Dunwiddie
(74) *Attorney, Agent, or Firm* — Birch, Stewart, Kolasch & Birch, LLP (57) ABSTRACT

A motorcycle wherein an attachment angle of a tail light bulb is increased to reduce a distance between a seat and a tail light unit, to improve the flexibility of a short tail design around a tail light of a motorcycle. The motorcycle includes a rear cowl attached to a rear part of a vehicle body frame, a seat catch arranged on a rear end portion of the vehicle body frame and configured to lock and to unlock an openable/closable seat, a tail light unit arranged behind the seat catch and attached to the rear cowl, a tail light bulb attached to the tail light unit in a forward-tilted state, and a rear fender covering an upper part of a rear wheel WR. An opening that allows access to the tail light bulb is formed at a portion of the rear fender facing the tail light bulb.

11 Claims, 12 Drawing Sheets

MOTORCYCLE

TECHNICAL FIELD

The present invention relates to a motorcycle, and more specifically to the arrangement of a tail light unit on a motorcycle.

BACKGROUND ART

As a conventional motorcycle, there is known a motorcycle in which an axial line of a tail light bulb and an insertion/removal direction of the tail light bulb are tilted in a direction not interfering with a seat and a rear fender (the tail light bulb is tilted forward while remaining in the same position) (see Patent Document 1, for example).

PRIOR ART DOCUMENT

Patent Document

Patent Document 1: JP-Y-03-041363

SUMMARY OF INVENTION

Problems to be Solved by the Invention

In the motorcycle disclosed in the above-described Patent Document 1, the axial line of the tail light bulb and the insertion/removal direction of the tail light bulb are tilted in the direction not interfering with the seat and the rear fender. For this reason, a tilt angle of the axial line of the bulb cannot be made large, which in turn makes it difficult to develop a characteristic design in which a tail light is arranged as close to a seat as possible. Moreover, in the case of actually performing the insertion or removal of the bulb, it is necessary to carry out such a troublesome operation as opening the seat first, and then inserting or removing the bulb. Particularly, the arrangement of the bulb in the tilted manner as described above also has a problem that the insertion or removal of the bulb is more complicated than in a normal arrangement in which the bulb is arranged to extend in a front-rear direction of a vehicle.

The present invention has been made in consideration of these circumstances and an object thereof is to provide a motorcycle in which an attachment angle of a tail light bulb is increased to reduce a distance between a seat and a tail light unit, to improve flexibility of short tail design around a tail light of a motorcycle thereby to enhance appearance of the motorcycle, and to make it easier to insert or remove the tail light bulb.

Means for Solving the Problems

In order to achieve the above object, the invention of claim 1 is characterized in that, in a motorcycle including: a vehicle body frame; a seat attached to a rear part of the vehicle body frame; a rear cowl surrounding a lower part of the seat; a tail light unit arranged behind the seat and covered with the rear cowl; a tail light bulb attached to the tail light unit in a forward-tilted state; and a rear fender covering an upper part of a rear wheel, an opening to allow access to the tail light bulb is formed at a portion of the rear fender facing the tail light bulb, and an axial line of the bulb is directed to the opening.

In addition to the configuration of the invention according to claim 1, the invention of claim 2 is characterized by further including an openable/closable or attachable/detachable lid portion covering the opening on the rear fender.

In addition to the configuration of the invention according to claim 2, the invention of claim 2 is characterized in that the lid portion is provided on the rear fender so as to be openable/closable or attachable/detachable by use of a plug member.

In addition to the configuration of the invention according to claim 2, the invention of claim 4 is characterized in that the lid portion is provided on the rear fender so as to be freely openable/closable by use of a hinge portion.

In addition to the configuration of the invention according to claim 4, the invention of claim 5 is characterized in that the hinge portion is provided behind the axial line of the bulb in the vehicle, and the lid portion is opened and closed by swinging a front side of the lid portion in the vehicle.

In addition to the configuration of the invention according to claim 1, the invention of claim 6 is characterized by further including a stay portion attached to a rear end portion of the vehicle body frame and configured to support the rear fender, a rear blinker, and a license light.

In addition to the configuration of the invention according to claim 6, the invention of claim 7 is characterized by further including a stay support frame fixed to the rear end portion of the vehicle body frame and having the stay portion attached thereto, and in that an opening to allow access to the tail light bulb is formed at a portion of the stay support frame facing the tail light bulb.

In addition to the configuration of the invention according to claim 6, the invention of claim 8 is characterized in that the stay portion is split into right and left sides.

In addition to the configuration of the invention according to claim 1, the invention of claim 9 is characterized in that the rear fender includes a bent portion protruding upward, and at least part of the tail light bulb is arranged inside the bent portion.

In addition to the configuration of the invention according to claim 9, the invention of claim 10 is characterized in that a seat catch configured to lock and to unlock the openable/closable seat is arranged on a rear end portion of the vehicle body frame, and the bent portion is arranged between the seat catch and the tail light bulb.

Advantage of the Invention

According to the motorcycle of claim 1, the tail light unit is arranged behind the seat, the tail light bulb is attached to the tail light unit in a forward-tilted state, the opening which allows access to the tail light bulb is formed at the portion of the rear fender facing the tail light bulb, and the axial line of the bulb is directed to the opening. Therefore, an attachment angle of the tail light bulb is increased and a distance between the seat and the tail light unit is reduced. In this way, flexibility of short tail design around a tail light of the motorcycle is improved to enhance appearance. Moreover, since the tail light bulb is easily accessed through the opening, the insertion or removal of the tail light bulb is made easy.

According to the motorcycle of claim 2, the lid portion is provided to be openable/closable or attachable/detachable and configured to cover the opening on the rear fender. Thus, the tail light bulb and a harness connected to the tail light bulb are protected against rocks, mud, water, and the like that may enter from below.

According to the motorcycle of claim 3, the lid portion is provided on the rear fender so as to be either openable/closable or attachable/detachable by use of the plug member. Thus, opening/closing or attachment/detachment of the lid portion is made easy, while insertion or removal of the tail light bulb is also made easy even after the provision of the lid portion.

According to the motorcycle of claim 4, the lid portion is provided on the rear fender so as to be freely openable/closable by use of the hinge portion. Thus, opening of the lid portion is made easy while insertion or removal of the tail light bulb is made easy even after the provision of the lid portion.

According to the motorcycle of claim 5, the hinge portion is provided behind the axial line of the bulb in the vehicle and the lid portion is opened and closed by swinging a front side of the lid portion in the vehicle. Therefore, the tail light bulb and the harness connected to the tail light bulb are protected against rocks, mud, water, and the like that may enter from below even if the lid portion is opened while driving. Moreover, even if the lid portion comes into contact with a rear wheel, the lid portion can still be moved in a closing direction.

According to the motorcycle of claim 6, the stay portion is attached to the rear end portion of the vehicle body frame and configured to support the rear fender, the rear blinker, and the license light. Therefore, it is not necessary to prepare components for supporting the rear fender, the rear blinker, and the license light separately. In this way, the number of components is reduced, so that manufacturing costs of the motorcycle can be reduced.

According to the motorcycle of claim 7, there is provided the stay support frame fixed to the rear end portion of the vehicle body frame and configured to attach the stay portion, and the opening that allows access to the tail light bulb is formed at the portion of the stay support frame facing the tail light bulb. Therefore, access to the tail light bulb is easily obtained through the opening, so that insertion or removal of the tail light bulb can be made easy.

According to the motorcycle of claim 8, the stay portion is split into right and left sides. Thus, downsizing and weight saving of the stay portion are achieved, so that manufacturing costs of the motorcycle can be reduced.

According to the motorcycle of claim 9, the rear fender includes the bent portion protruding upward and at least part of the tail light bulb is arranged inside the bent portion. Therefore, it is possible to attach the tail light bulb at a large angle without contact with the rear fender. Thus, the distance between the seat and the tail light unit is reduced. Hence the peripheral part of the tail light unit can be made compact to enhance appearance of the motorcycle. Moreover, at least part of an upper part of the tail light bulb is covered with the bent portion. Thus, it is possible to protect the tail light bulb and the harness connected to the tail light bulb against rocks, mud, water, and the like that may enter from above.

According to the motorcycle of claim 10, the seat catch for locking and unlocking the openable/closable seat is arranged on the rear end portion of the vehicle body frame and the bent portion is arranged between the seat catch and the tail light bulb. Therefore, it is possible to protect the tail light bulb and the harness connected to the tail light bulb against the seat catch which is arranged close thereto.

DESCRIPTION OF EMBODIMENTS

Hereinafter, an embodiment of a motorcycle according to the present invention will be described in detail with reference to the drawings. Note that the drawings are supposed to be viewed in directions of reference numerals. In the following description, front-to-back, right-to-left, and up-and-down directions are supposed to be in accordance with directions viewed from a driver, and the drawings indicate a front side of a vehicle as Fr, a rear side as Rr, a left side as L, a right side as R, an upper side as U, and a lower side as D.

Figure 1:
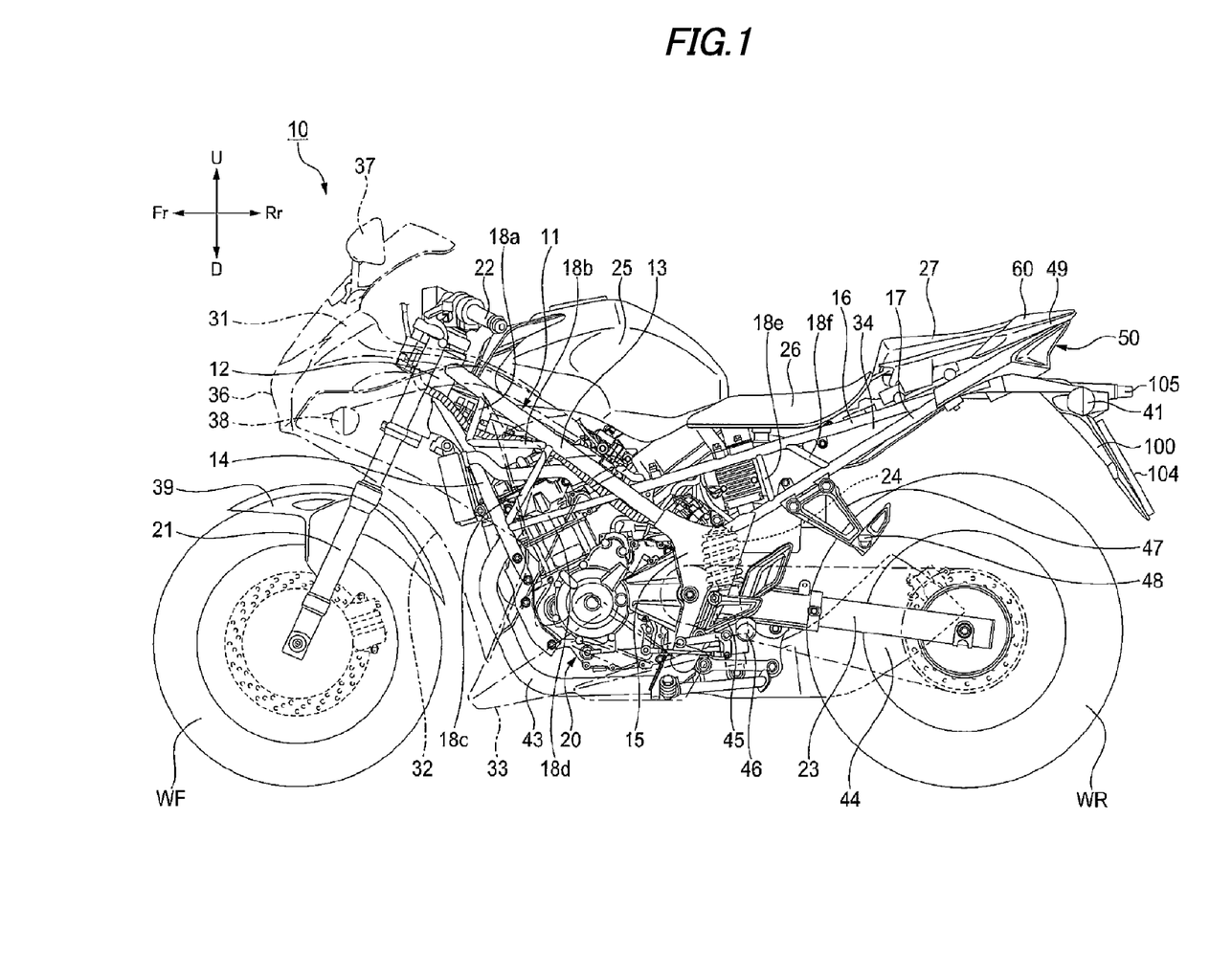
FIG. 1 is a left-side view for explaining an embodiment of a motorcycle according to the present invention.

As shown in FIG. 1, a motorcycle 10 of this embodiment includes a vehicle body frame 11 which is formed of a head pipe 12 provided on a front end, a right and left pair of main frames 13 extending backward and downward from the head pipe 12, a right and left pair of down tubes 14 extending backward and downward from the head pipe 12, a right and left pair of pivot plates 15 connected to rear end portions of the right and left pair of main frames 13, a right and left pair of seat frames 16 being connected to rear portions of the right and left pair of main frames 13 and extending backward and upward, a right and left pair of sub-frames 17 being connected to the pivot plates 15, extending backward and upward, and having rear end portions connected to rear end portions of the seat frames 16, first to fourth reinforcing frames 18a, 18b, 18c, and 18d connected between the main frames 13 and the down tubes 14, and fifth and sixth reinforcing frames 18e and 18f connected between the sear frames 16 and the sub-frames 17. An engine 20 is attached to the down tubes 14 and the pivot plates 15.

Moreover, the motorcycle 10 includes a front fork 21 steerably supported on the headpipe 12, a front wheel WF rotatably supported by a lower end portion of the front fork 21, a steering handle 22 attached to an upper end portion of the front fork 21, a swing arm 23 swingably supported by the pivot plates 15, a rear wheel WR rotatably supported by a rear end portion of the swing arm 23, rear wheel suspension units 24 provided between the swing arm 23 and the pivot plates 15, a fuel tank 25 provided above the main frames 13, and a driver seat 26 and a pillion seat 27 of an openable/closable type provided above the seat frames 16.

Here, in FIG. 1, reference numeral 31 denotes a front cowl, reference numeral 32 denotes a front side cowl, reference numeral 33 denotes an under cowl, reference numeral 34 denotes a side cowl, reference numeral 36 denotes a headlight unit, reference numeral 37 denotes a side mirror, reference numeral 38 denotes a front blinker, reference numeral 39 denotes a front fender, reference numeral 41 denotes a rear blinker, reference numeral 43 denotes an exhaust pipe, reference numeral 44 denotes a muffler, reference numeral 45 denotes a main step holder, reference numeral 46 denotes a main step, reference numeral 47 denotes a pillion step holder, and reference numeral 48 denotes a pillion step.

Moreover, as shown in FIG. 2 to FIG. 10, the motorbike 10 includes a tail light unit 50 attached to rear portions of the right and left pair of seat frames 16, a rear cowl 60 covering a peripheral part of the tail light unit 50, a stay support frame 70 fixed to the rear end portions of the right and left pair of seat frames 16, a stay portion 80 attached to the stay support frame 70, a seat catch 90 attached to the stay support frame 70 and configured to perform locking and unlocking of the pillion seat 27 of the openable/closable type, and a rear fender 100 attached to the right and left pair of the seat frames 16 and to the stay portion 80 and configured to cover an upper part of the rear wheel WR.

Figure 2:
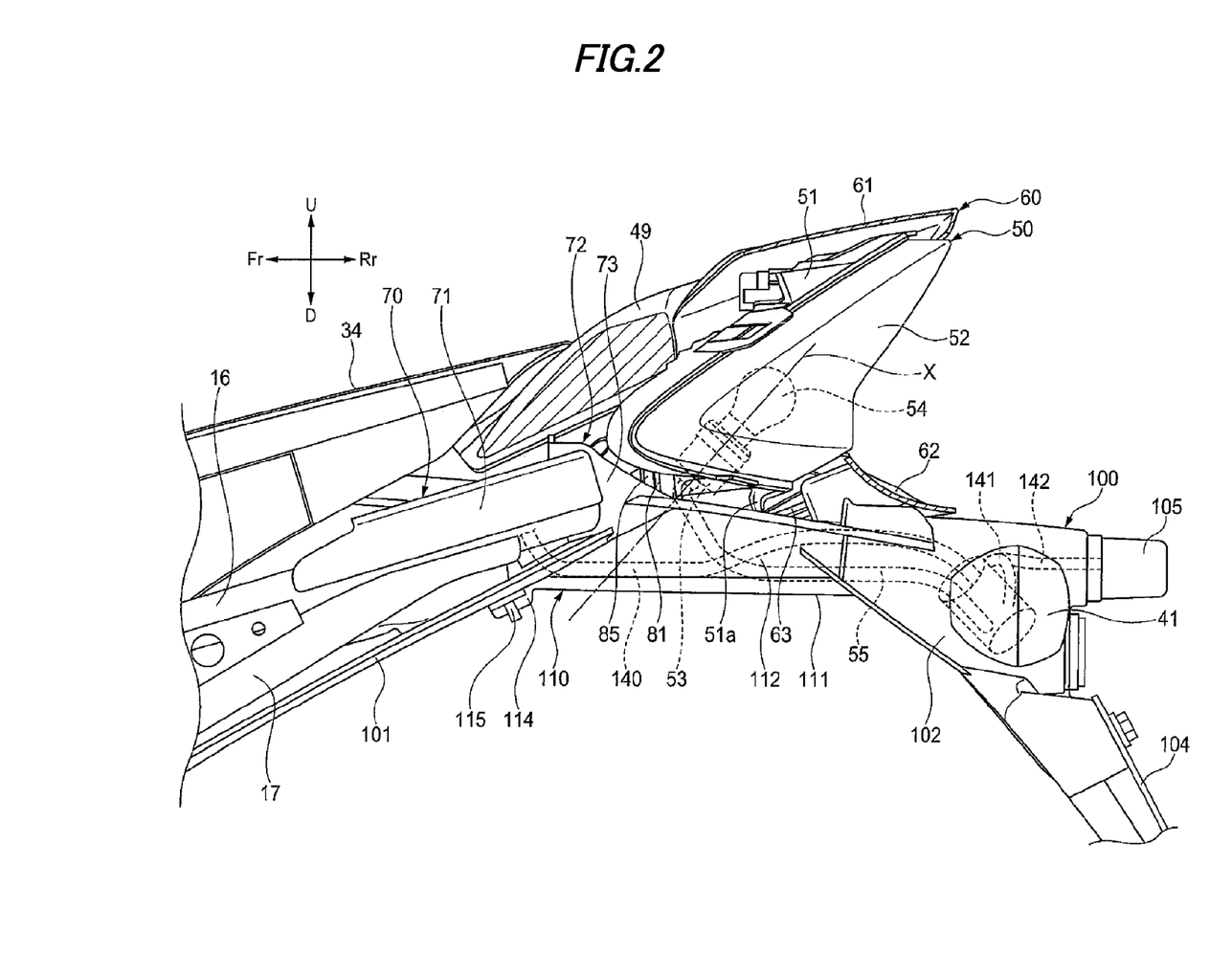
FIG. 2 is a partially cut-away left-side view of a peripheral part of a tail light unit shown in FIG. 1.

As shown in FIG. 2, the tail light unit 50 includes a tail light housing 51 supported on the seat frame 16 side, a tail light lens 52 having a front opening occluded by the tail light housing 51, a tail light bulb socket 53 attached from a backside to the tail light housing 51, and a tail light bulb 54 attached to the tail light bulb socket 53. Meanwhile, the tail light bulb socket 53 is provided with a harness 55 connected to the tail light bulb 54. Moreover, in this embodiment, the tail light bulb socket 53 and the tail light bulb 54 are fixed to the tail light housing 51 in a state where an axial line X thereof is tilted forward.

As shown in FIG. 4 and FIG. 8 to FIG. 10, the rear cowl 80 is attached to the rear portions of the right and left pair of seat frames 16 and includes an upper cover portion 61 covering from a side part to an upper part of the tail light unit 50, and a lower cover portion 62 covering from the side part to a lower part of the tail light unit 50. Meanwhile, a tail light support 63 for supporting the tail light unit 50 is provided so as to protrude forward on a rear face at a central part in a vehicle width direction of the lower cover portion 62. A support protruding piece 51a formed at a lower end portion of the tail light housing 51 is fastened onto this tail light support 63 by use of a screw 64.

Figure 4:
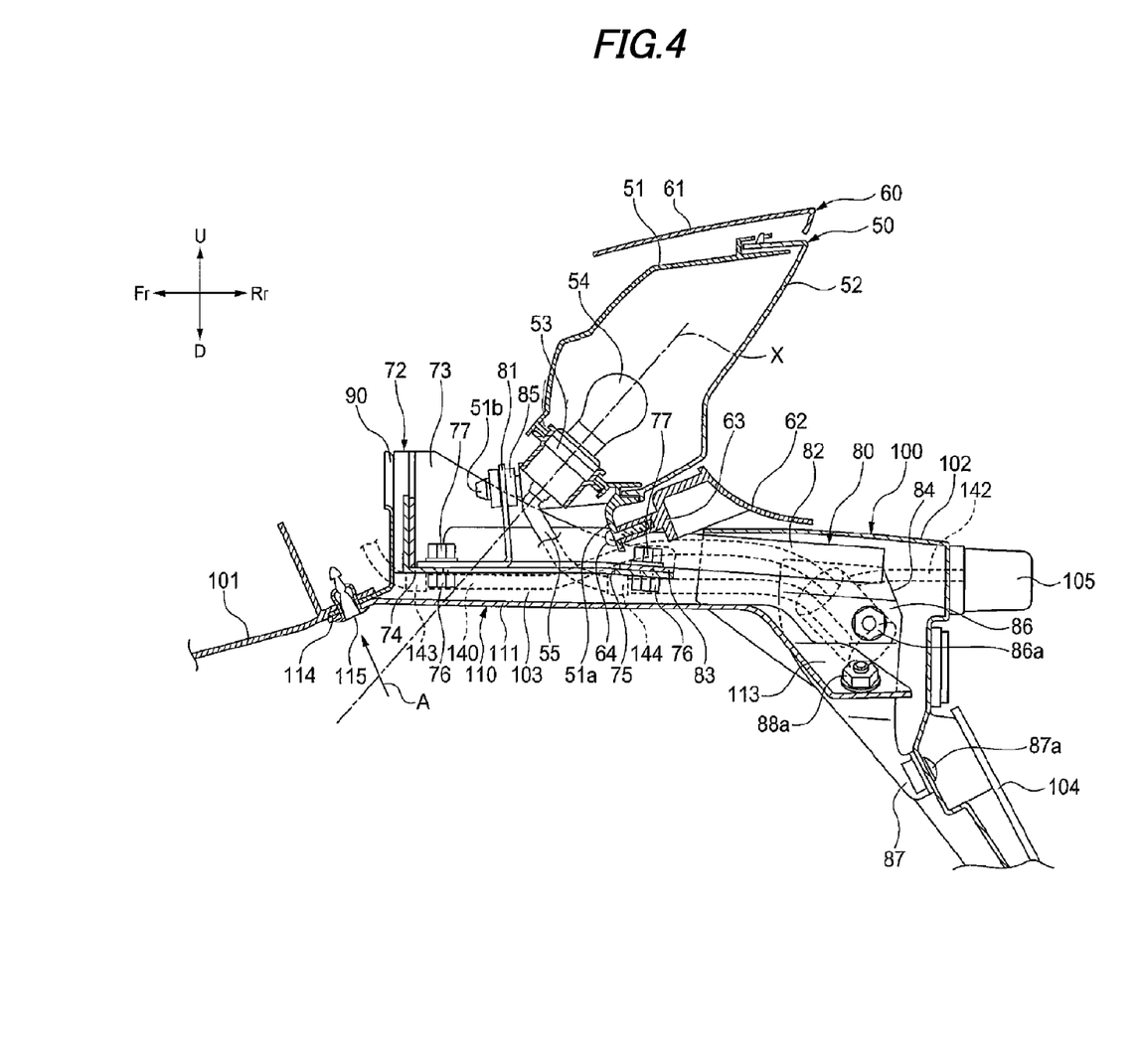
FIG. 4 is a partially cut-away vertical cross-sectional view of the peripheral part of the tail light unit shown in FIG. 1 passing through a vehicle central line.
Figure 5:
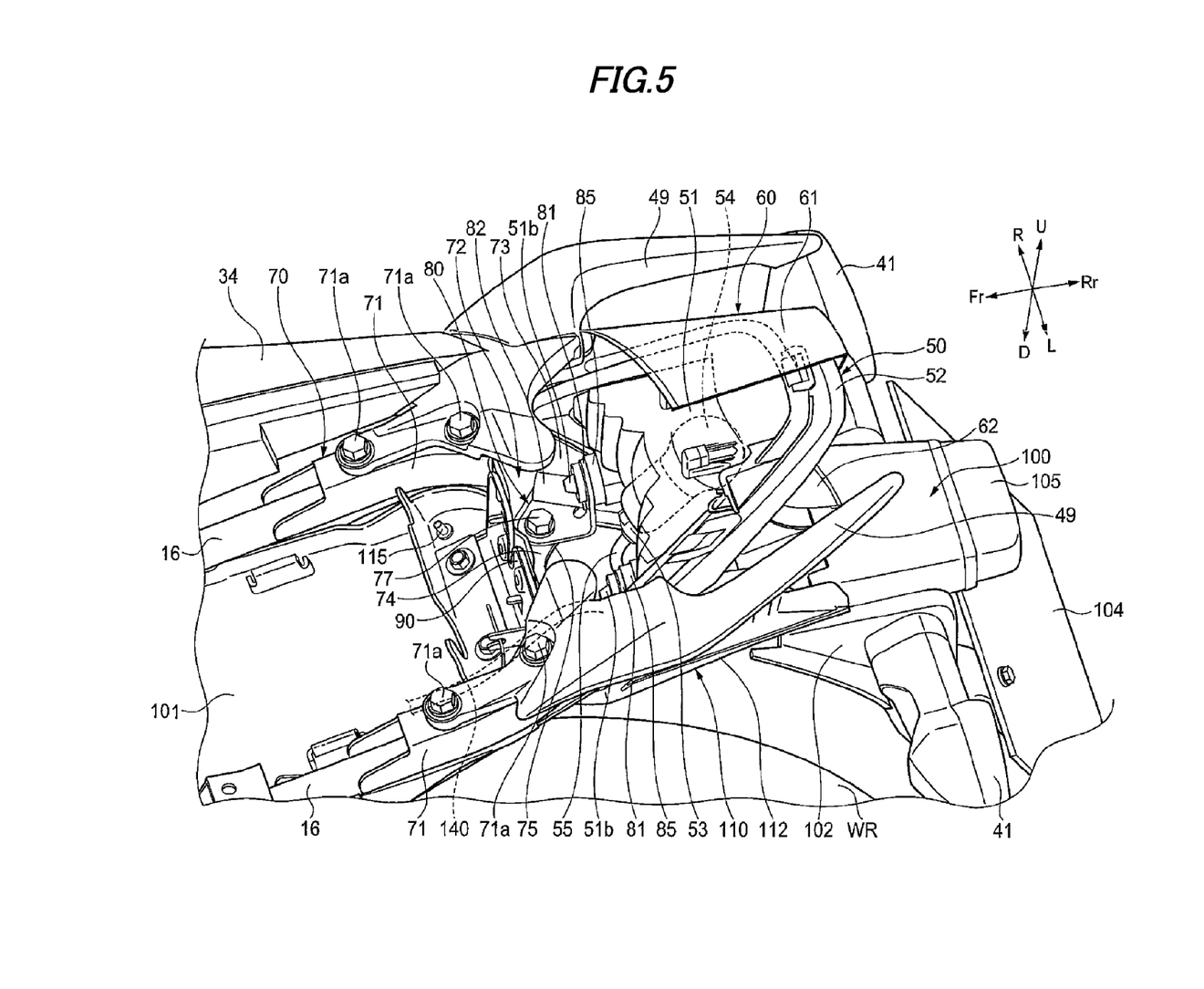
FIG. 5 is a partially cut-away perspective view of the peripheral part of the tail light unit shown in FIG. 1 viewed from above.
Figure 6:
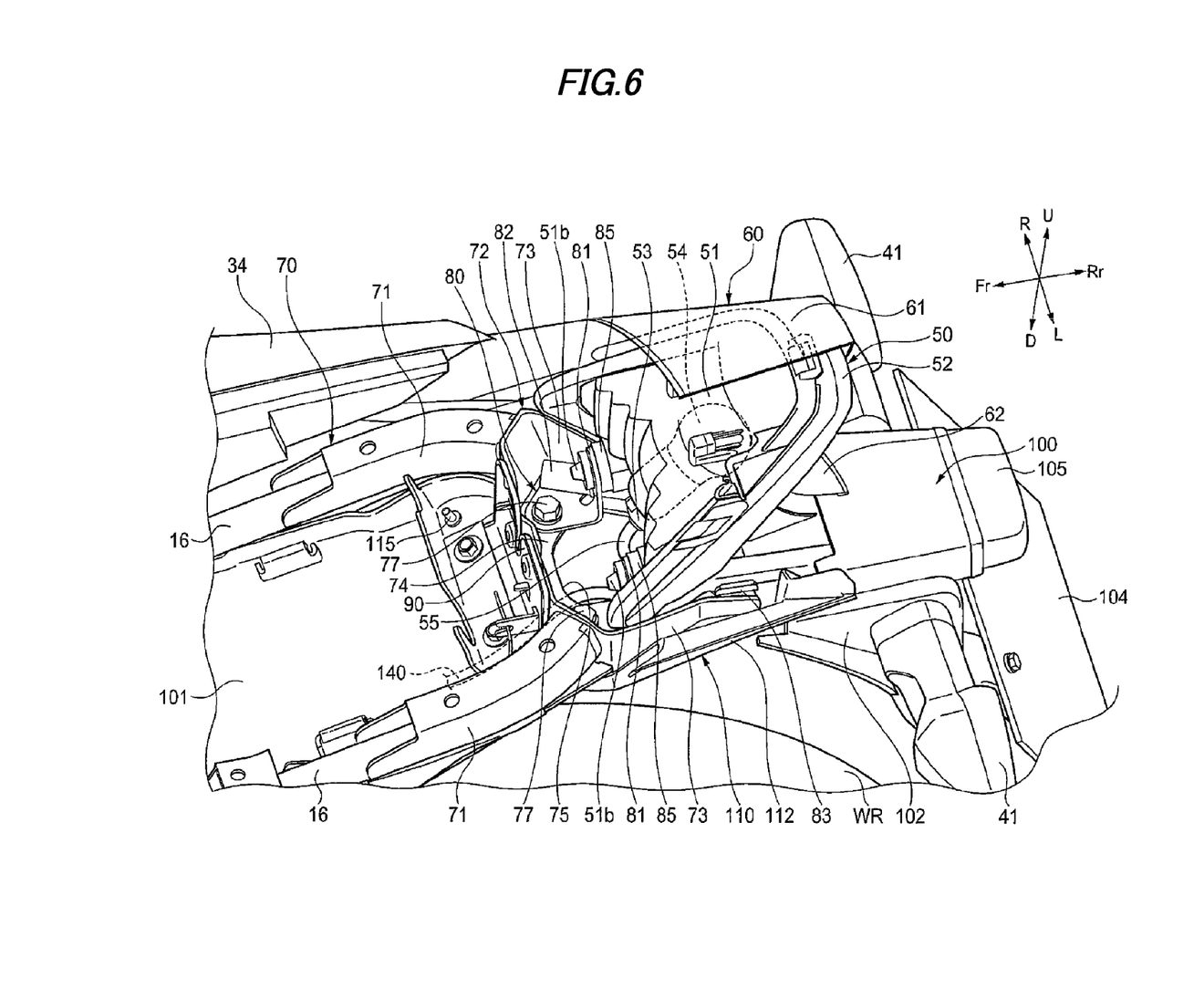
FIG. 6 is a partially cut-away perspective view of the peripheral part of the tail light unit in a state of detaching grab rails from FIG. 5.

As shown in FIG. 4 to FIG. 6, the stay support frame 70 includes a right and left pair of side frames 71 fixed to the rear end portions of the right and left pair of seat frames 16, and a base frame 72 fixed to rear end portions of the right and left pair of side frames 71. Meanwhile, a right and left pair of grab rails 49 are fastened onto upper faces of the right and left pair of side frames 71 by use of bolts 71a.

The base frame 72 includes a right and left pair of side plates 73 fixed to the right and left pair of side frames 71, and a bottom plate 74 fixed along lower edges of the right and left pair of side plates 73. Moreover, in this embodiment, a first opening 75 allowing access to the tail light bulb 54 is formed at a portion of the bottom plate 74 facing the tail light bulb 54.

Figure 8:
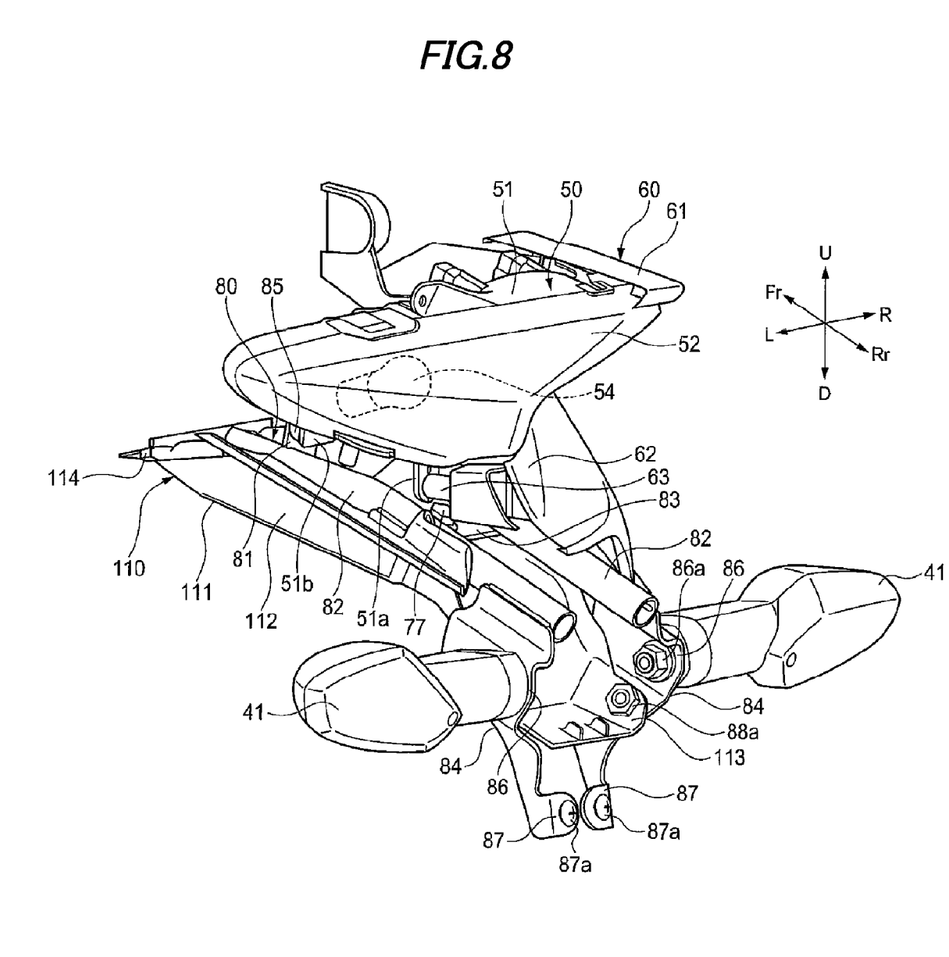
FIG. 8 is a partially cut-away perspective view of the peripheral part of the tail light unit viewed from behind.
Figure 9:
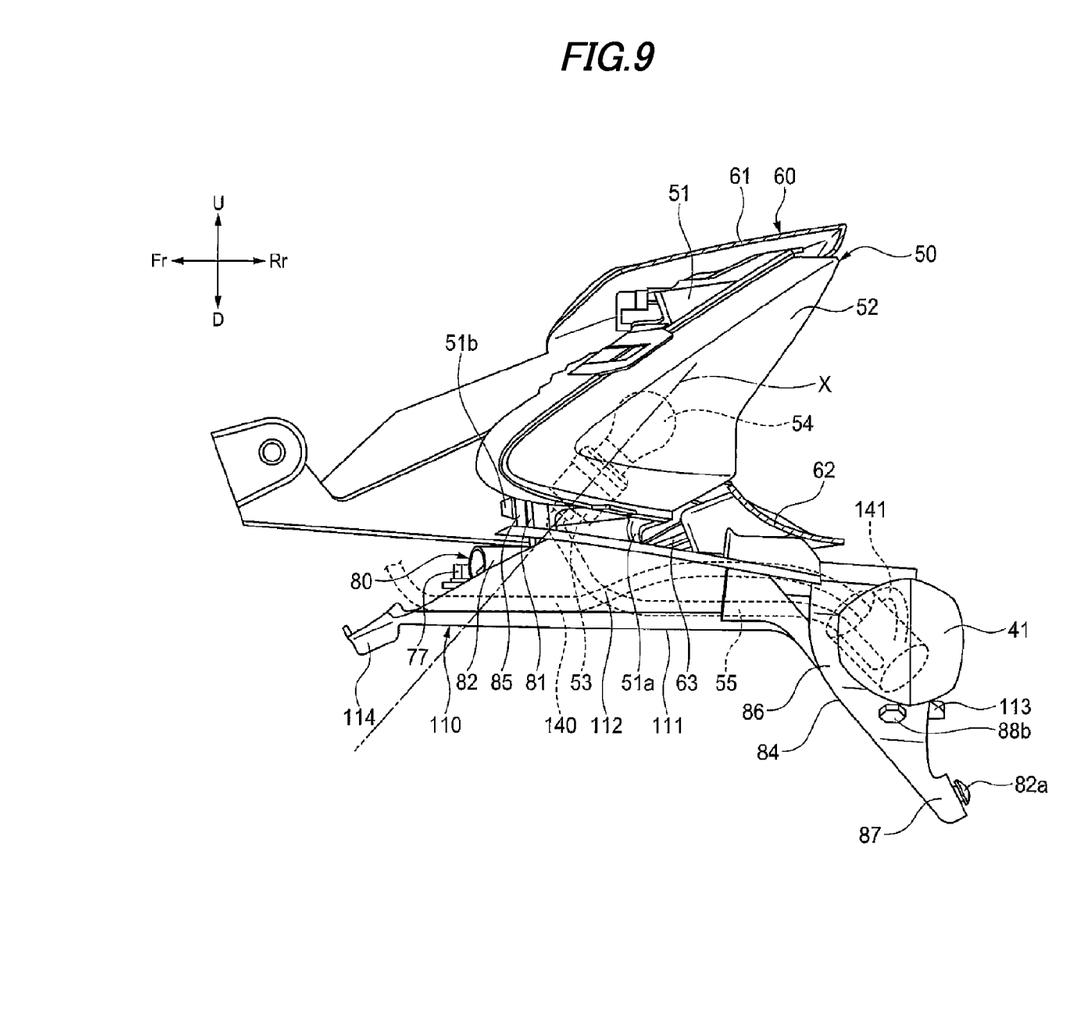
FIG. 9 is a partially cut-away left-side view of the peripheral part of the tail light unit shown in FIG. 8.
Figure 10:
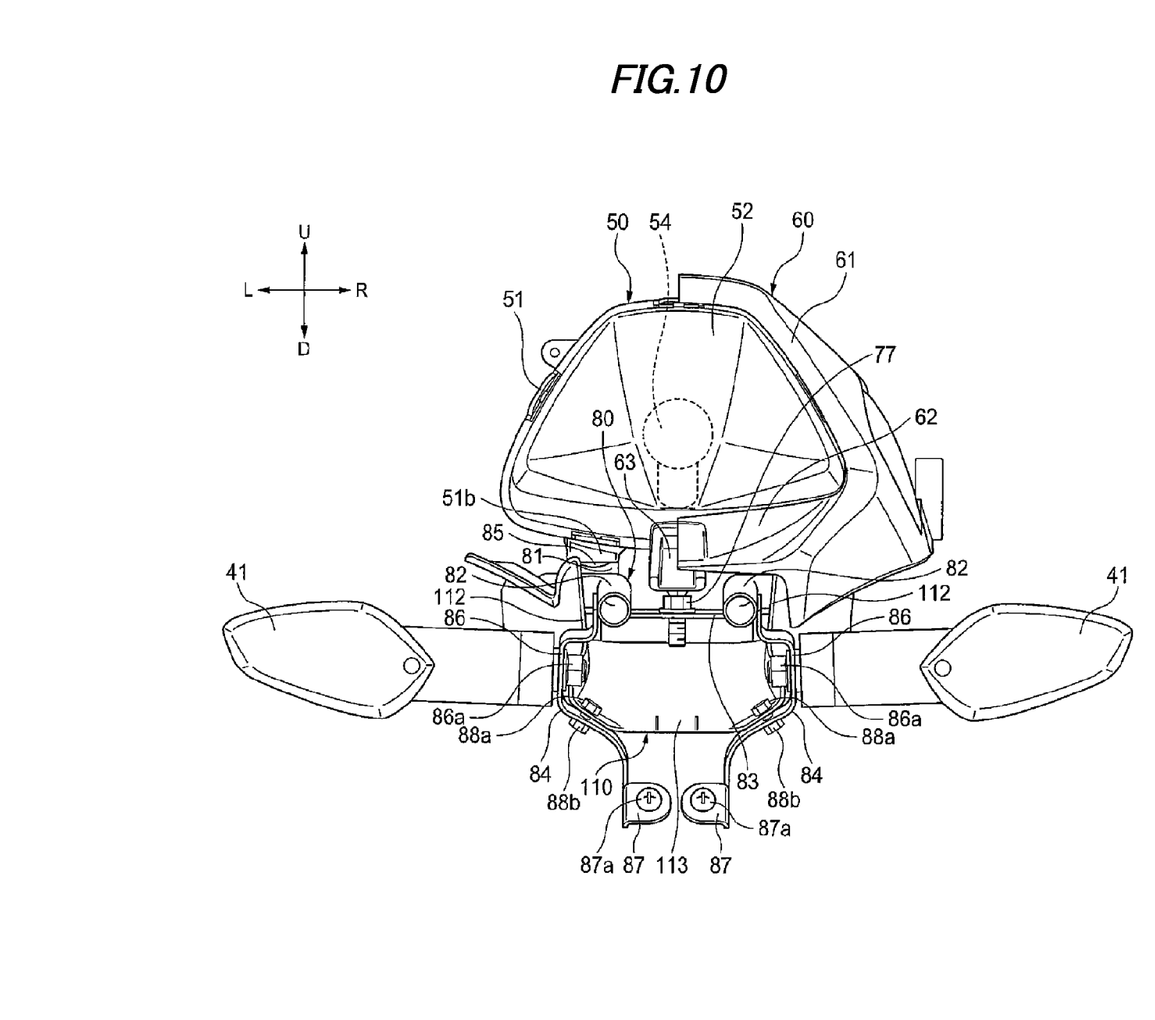
FIG. 10 is a partially cut-away rear view of the peripheral part of the tail light unit shown in FIG. 8.

As shown in FIG. 4, FIG. 6, and FIG. 8, the stay portion 80 is split into right and left sides and includes a right and left pair of tail light support stays 81 supporting the tail light unit 50, a right and left pair of stay pipes 82 being fixed to the right and left pair of tail light support stays 81 and extending backward, a cross member 83 connecting intermediate portions of the right and left pair of stay pipes 82 in the vehicle width direction, and a right and left pair of rear portion support stays 84 being fixed to rear end portions of the right and left pair of stay pipes 82 and supporting a right and left pair of rear blinkers 41 and the rear fender 100. Moreover, the stay portion 80 is fixed to the stay support frame 70 by fastening the right and left pair of tail light support stays 81 and the cross member 83 onto three nuts 76 that are welded on a lower face of the bottom plate 74 by using three bolts 77.

Figure 3:
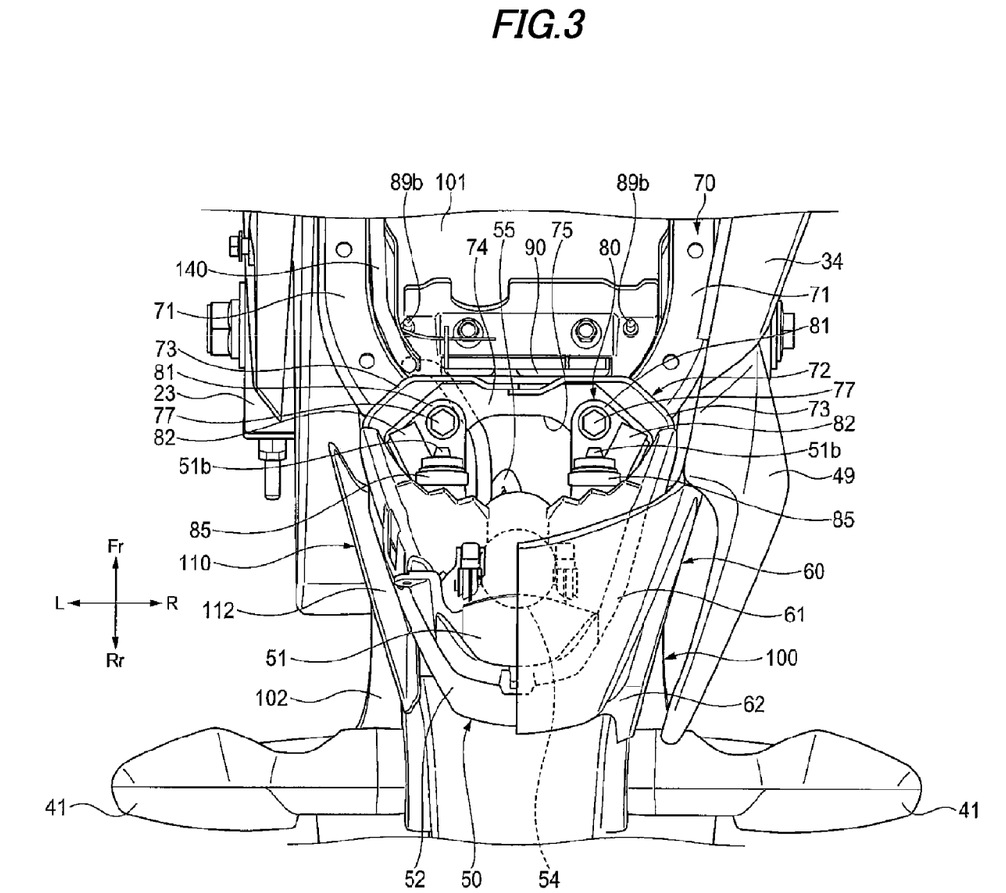
FIG. 3 is a partially cut-away plan view of the peripheral part of the tail light unit shown in FIG. 1.

As shown in FIG. 3, FIG. 4, and FIG. 6, elastic members 85 for elastically supporting the tail light unit 50 are attached to upper end portions of the tail light support stays 81, and a right and left pair of support protrusions 52b which are provided so as to protrude forward from a back face of the tail light housing 51 are inserted into these elastic members 85. In this way, the tail light unit 50 is elastically supported by the right and left pair of tail light support stays 81.

As shown in FIG. 4 and FIG. 8 to FIG. 10, the rear portion support stays 84 include rear blinker support portions 86 formed upper parts thereof and configured to allow the rear blinkers 41 to be fastened thereon together with a second rear fender 102 to be described later by using nuts 86a, and rear fender supports 87 formed at lower portions thereof and configured to allow the later-described second rear fender 102 to be fastened thereon by use of screws 87a.

Figure 7:
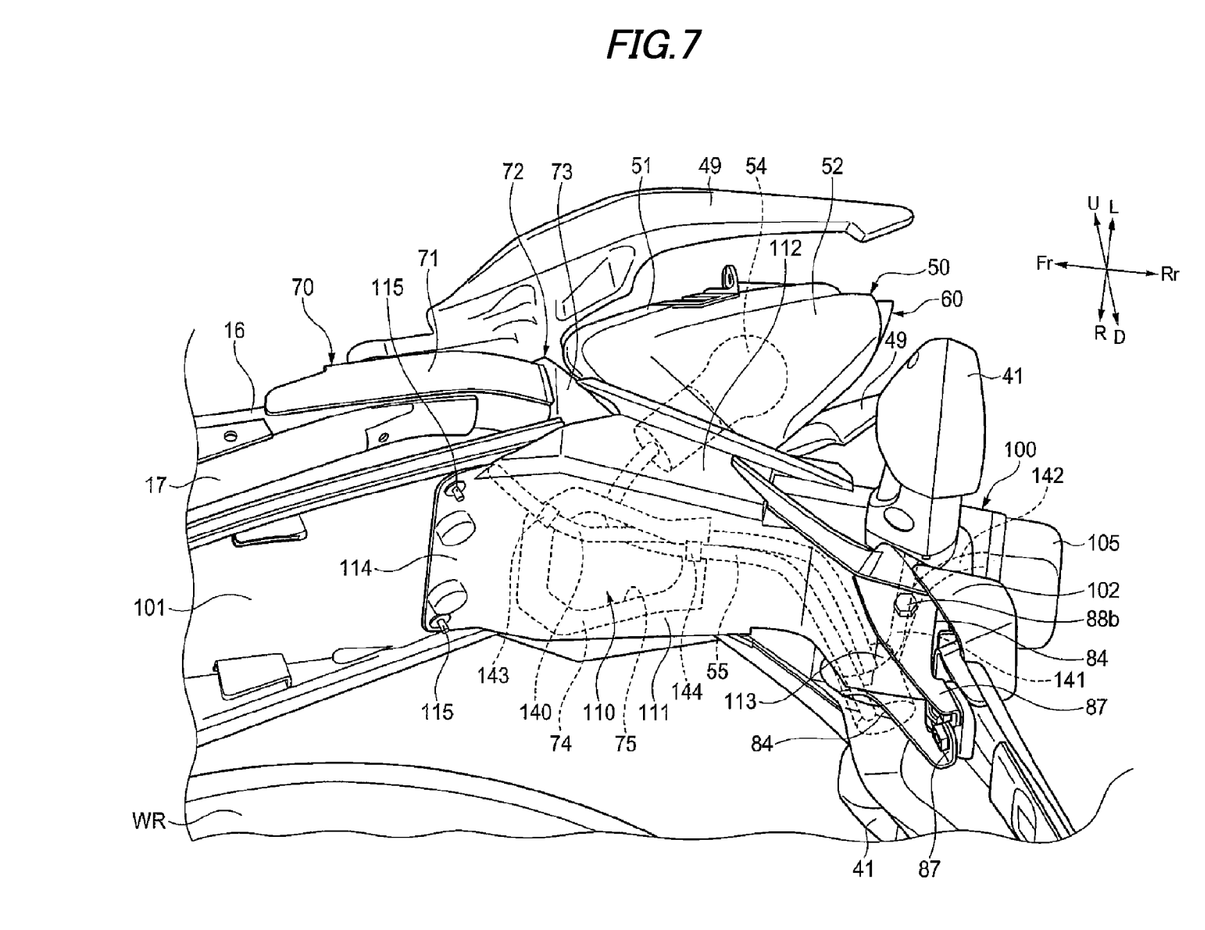
FIG. 7 is a partially cut-away perspective view of the peripheral part of the tail light unit shown in FIG. 1 viewed from below.

As shown in FIG. 4, FIG. 6, and FIG. 7, the rear fender 100 includes a first rear fender 101 attached to the right and left pair of seat frames 16, the second fender 102 attached to the rear portion support stays 84 of the stay portion 80, a second opening 103 (see FIG. 4) provided between the first and second rear fenders 101 and 102 and configured to communicate with the first opening 75 and to allow access to the tail light bulb 54, and a lid portion 110 covering the first and second openings 75 and 103. Moreover, the second rear fender 102 is provided with a license plate 104 and a license light 105 configured to light up the license plate 104.

Here, as shown in FIG. 2, FIG. 4, and FIG. 7, a harness 140 from an unillustrated battery is supported by a clip 143 provided on the lower face of the bottom plate 74 of the base frame 72 and around the first opening 75, and is allowed to pass through the first aperture 75 and to extend into the rear portion support stays 84. Then, a harness connected to the rear blinkers 41, the harness connected to the tail light bulb 54, and a harness connected to the license light 105 are respectively branched off from the harness extended to the rear portion support stays 84. The harness 55 connected to the tail light bulb 54 is supported by a clip 144 provided on the lower face of the bottom plate 74 of the base frame 72 and around the first opening 75 and is allowed to pass through the first aperture 75.

As shown in FIG. 4 and FIG. 7, the lid portion 110 includes a bottom plate 111 and side plates 112 provided upright from both of right and left edges of the bottom plate 111. Meanwhile, a rear attachment portion 113 inserted between the right and left pair of rear portion support stays 84 as well as fastened onto the right and left pair of rear portion support stays 84 by use of nuts 88a and bolts 88b are formed on a rear end portion of the bottom plate 111, and a front attachment portion 114 attached to a rear bottom face of the first rear fender 101 is formed on a front end portion thereof. By pressing a protrusion of a plug member 115 in a direction of an arrow A and causing a bulging portion of the protrusion to expand a diameter of a head portion, the front attachment portion 114 of this lid portion 110 is plugged in and fixed to the first rear fender 101 together with the seat catch 90. Moreover, by further pressing the protrusions in the direction of the arrow A, the diameter of the head portion is contracted beyond the bulging portion whereby the plug member 115 is detached. In this way, the lid portion 110 is made openable/closable or attachable/detachable from the rear fender 101 and the rear portion support stays 84 byway of the plug member 115. Hence the inside of the lid portion can be maintained easily.

According to the motorcycle 10 configured as described above, it is possible to have access to the tail light bulb 54 from below (from the rear wheel WR side). Therefore, it is possible to cause an attachment angle of the tail light bulb 54 to be tilted forward (to set closer to a vertical direction) more than a conventional tail light unit. For this reason, as the attachment angle of the tail light bulb 54 is tilted more forward, a distance between the pillion seat 27 or the seat catch 90 and the tail light unit 50 is reduced. Accordingly, it is possible to achieve sporty downsizing of the rear cowl 60 and the rear fender 100, which are peripheral components of the tail light unit 50, and thereby to improve flexibility of short tail design around the tail light unit 50 of the motorcycle 10 and to enhance appearance. Moreover, by detaching the lid portion 110, it is possible to have access to the tail light bulb 54 through the first and second openings 75 and 103. Hence an operation to attach or detach the tail light bulb 54 is made easy.

As described above, according to the motorcycle 10 of this embodiment, the tail light unit 50 is arranged behind the pillion seat 27, the tail light bulb 54 is attached to the tail light unit 50 in the forward-tilted state, the second opening 103 which allows access to the tail light bulb 54 is formed at the portion of the rear fender 100 facing the tail light bulb 54, and the axial line X of the bulb 54 is directed to the second opening 103. Therefore, it is possible to increase the attachment angle of the tail light bulb 54 and to reduce the distance between the pillion seat 27 or the seat catch 90 and the tail light unit 50. In this way, it is possible to achieve sporty downsizing of the rear cowl 60 and the rear fender 100, which are the peripheral components of the tail light unit 50, and thereby to enhance appearance of the motorcycle 10. Moreover, it is possible to have access to the tail light bulb 54 through the second opening 103 easily. Hence insertion or removal of the tail light bulb 54 can be made easy.

Moreover, according to the motorcycle 10 of this embodiment, since the lid portion 110 made either openable/closable or attachable/detachable and configured to cover the second opening 103 is provided, it is possible to protect the tail light bulb 54 and the harness 55 connected to the tail light bulb 54 against rocks, mud, water, and the like that may enter from below.

Moreover, according to the motorcycle 10 of this embodiment, there is provided the stay portion 80 attached to the rear end portion of the sheet frames 16 and configured to support the second rear fender 102, the rear blinkers 41, and the license light 105. Therefore, it is not necessary to prepare components for supporting the second rear fender 102, the rear blinkers 41, and the license light 105 separately. In this way, it is possible to reduce the number of components and thereby to reduce manufacturing costs of the motorcycle 10.

Moreover, according to the motorcycle 10 of this embodiment, there is provided the stay support frame 70 fixed to the rear end portions of the seat frames 16 and configured to attach the stay portion 80, and the first opening 75 that allows access to the tail light bulb 54 is formed at the portion of the stay support frame 70 facing the tail light bulb 54. Therefore, access to the tail light bulb 54 is easily obtained through the first opening 75, so that insertion or removal of the tail light bulb 54 can be made easy.

Moreover, according to the motorcycle 10 of this embodiment, since the stay portion is split into right and left sides, it is possible to achieve downsizing and weight saving of the stay portion 80 and thereby to reduce manufacturing costs of the motorcycle 10.

Figure 11:
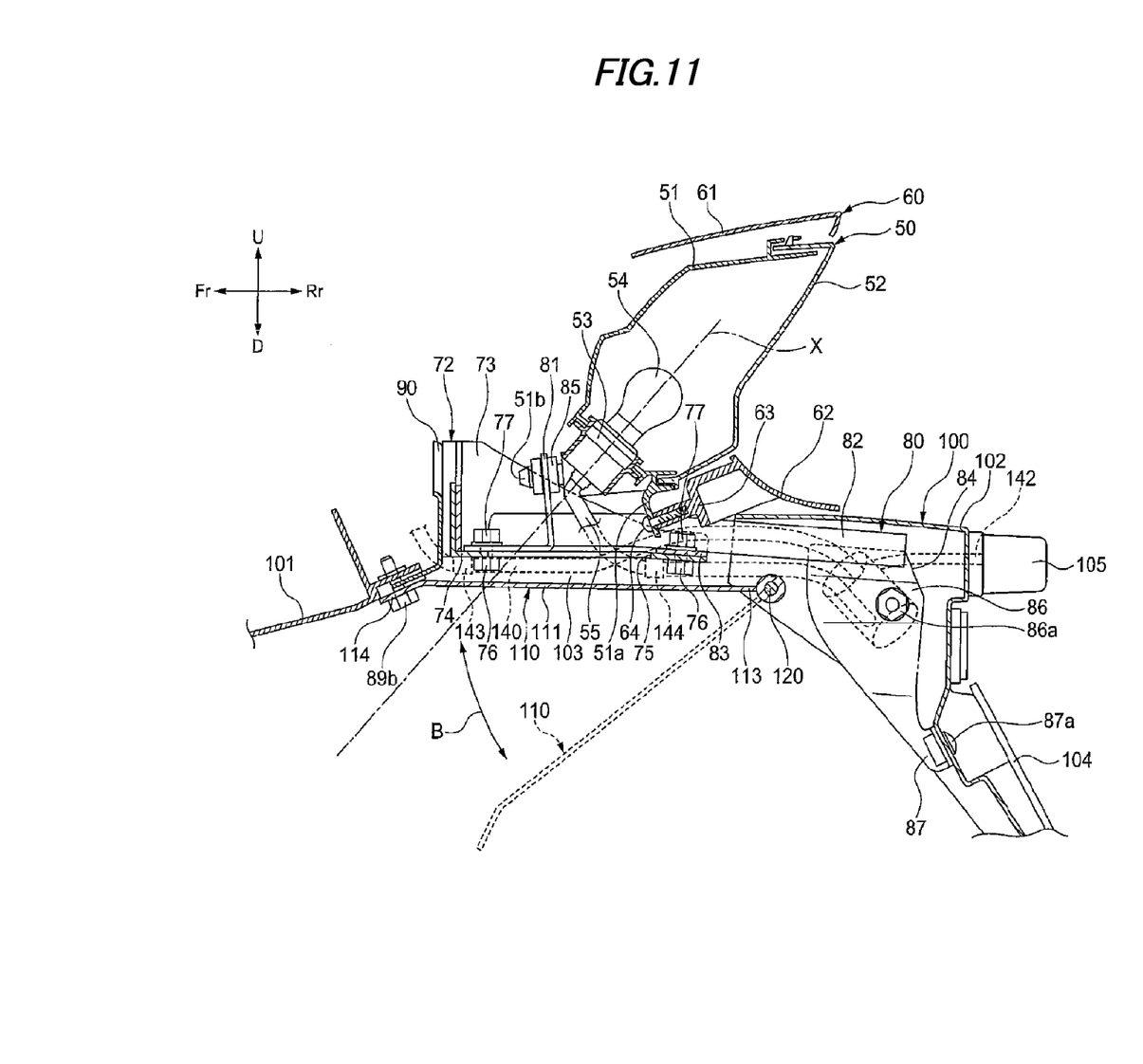
FIG. 11 is a cross-sectional view for explaining a first modified example of the embodiment of the motorcycle according to the present invention.

Here, as a first modified example of this embodiment, the lid portion 110 may be provided on the second rear fender 102 so as to be freely openable/closable by use of a hinge portion 120 as shown in FIG. 11. Moreover, in this modified example, the hinge portion 120 is provided on the rear attachment portion 113 of the lid portion 110 behind the axial line X of the tail light bulb 54 in the vehicle, and the lid portion 110 is opened and closed by swinging a front side of the lid portion 110 in the vehicle as indicated with an arrow B.

Moreover, according to this modified example, since the lid portion 110 is provided on the rear fender 100 so as to be freely openable/closable by use of the hinge portion 120, it is possible to open and close the lid portion 110 easily and to facilitate insertion or removal of the tail light bulb 54 even after the provision of the lid portion 110. In particular, since the openings are opened in the direction of the axial line of the tail light bulb 54, a hand can be easily put into the openings and insertion or removal of the tail light bulb 54 can be performed very smoothly.

Meanwhile, according to this modified example, the lid portion 110 is opened forward relative to the vehicle 10 by way of the hinge portion 120. Therefore, in case a gap is formed on the lid portion 110 during driving, it is possible to protect the tail light bulb 54 and the harness 55 connected to the tail light bulb 54 against rocks, mud, water, and the like that may enter from below due to rotation of the rear wheel WR.

Figure 12:
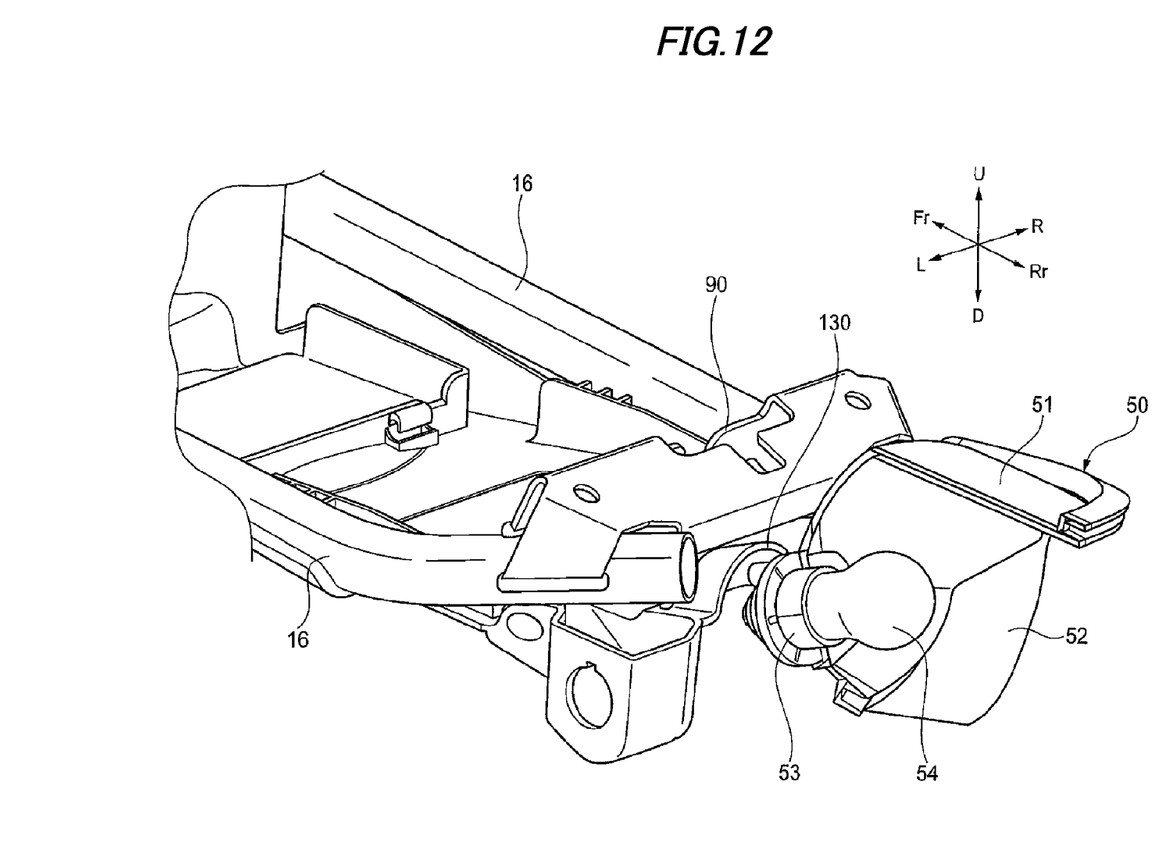
FIG. 12 is a partially cut-away perspective view for explaining a second modified example of the embodiment of the motorcycle according to the present invention.

Meanwhile, as a second modified example of this embodiment, a bent portion 130 configured to protrude upward may be provided at a rear end portion of the first rear fender 101 and the tail light bulb socket 53 for attaching the tail light bulb 54 may be arranged inside this bent portion 130 as shown in FIG. 12. Moreover, in this modified example, the bent portion 130 is arranged between the seat catch 90 and the tail light bulb socket 53 (the tail light bulb 54).

Moreover, according to this modified example, since there is provided the bent portion protruding upward at the rear end portion of the first rear fender 101 and the tail light socket for attaching the tail light bulb 54 is arranged inside the bent portion 130, it is possible to attach the tail light bulb 54 at a large angle without contact with the rear fender 100. In this way, it is possible to reduce the distance between the pillion seat 27 or the seat catch 90 and the tail light unit 50. Hence the peripheral part of the tail light unit 50 is made compact to enhance appearance of the motorcycle 10. Moreover, since an upper part of tail light bulb socket 53 for attaching the tail light bulb 54 is covered with the bent portion 130, it is possible to protect the tail light bulb socket 53, the tail light bulb 54, and the harness 55 connected to the tail light bulb 54 against rocks, mud, water, and the like that may enter from above.

Moreover, according to this modified example, since the bent portion 130 is arranged between the seat catch 90 and the tail light bulb socket 53 (the tail light bulb 54). Therefore, it is possible to protect the tail light bulb socket 53, the tail light bulb 54, and the harness 55 connected to the tail light bulb 54 against the seat catch 90 which is arranged close thereto.

The present invention has been hitherto described in detail and with reference to the specific embodiments, but it is apparent to those skilled in the art that the present invention can be changed or modified in various manners without departing from the spirit and scope of the present invention. This application is based on Japanese Patent Application (2009-200503) filed on Aug. 31, 2009, and the contents of which are incorporated herein by reference.

EXPLANATION OF THE REFERENCE NUMERALS

10 MOTORCYCLE
11 VEHICLE BODY FRAME
16 SEAT FRAME
41 REAR BLINKER
50 TAIL LIGHT UNIT
51 TAIL LIGHT HOUSING
52 TAIL LIGHT LENS
53 TAIL LIGHT BULB SOCKET
54 TAIL LIGHT BULB
55 HARNESS
60 REAR COWL
63 TAIL LIGHT SUPPORT
70 STAY SUPPORT FRAME
71 SIDE FRAME
72 BASE FRAME
75 FIRST OPENING
80 STAY PORTION
81 TAIL LIGHT SUPPORT STAY
82 STAY PIPE
84 REAR PORTION SUPPORT STAY
90 SEAT CATCH
100 REAR FENDER
101 FIRST REAR FENDER
102 SECOND REAR FENDER
103 SECOND OPENING
110 LID PORTION
120 HINGE PORTION
130 BENT PORTION
WR REAR WHEEL

The invention claimed is:

1. A motorcycle comprising:
a vehicle body frame;
a seat attached to a rear part of the vehicle body frame;
a rear cowl surrounding a lower part of the seat;
a tail light unit arranged behind the seat and covered with the rear cowl;
a tail light bulb attached to the tail light unit in a forward-tilted state; and
a rear fender covering an upper part of a rear wheel,
wherein a first opening to allow access to the tail light bulb is formed at a portion of the rear fender facing the tail light bulb,
wherein an axial line of the bulb is directed to the first opening,
wherein the motorcycle further comprising:
a lid portion covering the first opening on the rear fender;
a stay portion attached to a rear end portion of the vehicle body frame and configured to support at least the tail light bulb and the rear fender; and
a stay support frame which is fixed to the rear end portion of the vehicle body frame and to which the stay portion is attached, and
wherein a second opening to allow access to the tail light bulb is formed at a portion of the stay support frame facing the tail light bulb.

2. The motorcycle according to claim 1, wherein the lid portion is provided on the rear fender so as to be openable or detachable by use of a plug member.

3. The motorcycle according to claim 1, wherein the stay portion is configured to further support a rear blinker, and a license light.

4. The motorcycle according to claim 1, wherein the stay portion is split into right and left sides.

5. The motorcycle according to claim 1, wherein the rear fender includes a bent portion protruding upward, and
wherein at least part of the tail light bulb is arranged inside the bent portion.

6. The motorcycle according to claim 5, wherein a seat catch configured to lock and to unlock the seat is arranged on a rear end portion of the vehicle body frame, and
wherein the bent portion is arranged between the seat catch and the tail light bulb.

7. A motorcycle comprising:
a vehicle body frame;
a seat attached to a rear part of the vehicle body frame;
a rear cowl surrounding a lower part of the seat;
a tail light unit arranged behind the seat and covered with the rear cowl;
a tail light bulb attached to the tail light unit in a forward-tilted state; and
a rear fender covering an upper part of a rear wheel,
wherein an opening to allow access to the tail light bulb is formed at a portion of the rear fender facing the tail light bulb,
wherein an axial line of the bulb is directed to the opening,
wherein the motorcycle further comprising:
a lid portion covering the opening on the rear fender;
a stay portion attached to a rear end portion of the vehicle body frame and configured to support at least the tail light bulb and the rear fender; and
a stay support frame which is fixed to the rear end portion of the vehicle body frame and to which the stay portion is attached, and
wherein an opening to allow access to the tail light bulb is formed at a portion of the stay support frame facing the tail light bulb, and
wherein the lid portion is provided on the rear fender so as to be freely openable or closable by use of a hinge portion.

8. The motorcycle according of claim 7, wherein the hinge portion is provided behind the axial line of the bulb in the vehicle, and
wherein the lid portion is opened and closed by swinging a front side of the lid portion in the vehicle.

9. A motorcycle comprising:
a vehicle body frame;
a seat attached to a rear part of the vehicle body frame;
a rear cowl surrounding a lower part of the seat;
a tail light unit arranged behind the seat and covered with the rear cowl;
a tail light bulb attached to the tail light unit in a forward-tilted state; and
a rear fender covering an upper part of a rear wheel,
wherein an opening to allow access to the tail light bulb is formed at a portion of the rear fender facing the tail light bulb,
wherein an axial line of the bulb is directed to the opening, and
wherein a lid portion is further provided for covering the opening on the rear fender.

10. A motorcycle comprising:
a vehicle body frame;
a seat attached to a rear part of the vehicle body frame;
a rear cowl surrounding a lower part of the seat;
a tail light unit arranged behind the seat and covered with the rear cowl;
a tail light bulb attached to the tail light unit in a forward-tilted state; and a rear fender covering an upper part of a rear wheel, wherein an opening to allow access to the tail light bulb is formed at a portion of the rear fender facing the tail light bulb, wherein an axial line of the bulb is directed to the opening, and wherein a stay portion is provided which is attached to a rear end portion of the vehicle body frame and configured to support the rear fender, a rear blinker, and a license light.

11. A motorcycle comprising:

a vehicle body frame;

a seat attached to a rear part of the vehicle body frame;

a rear cowl surrounding a lower part of the seat;

a tail light unit arranged behind the seat and covered with the rear cowl;

a tail light bulb attached to the tail light unit in a forward-tilted state; and a rear fender covering an upper part of a rear wheel, wherein an opening to allow access to the tail light bulb is formed at a portion of the rear fender facing the tail light bulb, wherein an axial line of the bulb is directed to the opening, and wherein the rear fender includes a bent portion protruding upward, and at least part of the tail light bulb is arranged inside the bent portion.

* * * * *